(12) United States Patent
Dettman et al.

(10) Patent No.: US 6,652,217 B2
(45) Date of Patent: Nov. 25, 2003

(54) SYSTEM AND METHOD FOR SEPARATING DOUBLE BLANKS

(75) Inventors: Mark Prentiss Dettman, Wixom, MI (US); Brian Jay Bethke, Pinckney, MI (US)

(73) Assignee: Kawasaki Robotics (USA), Inc., Wixom, MI (US)

( * ) Notice: Subject to any disclaimer, the term of this patent is extended or adjusted under 35 U.S.C. 154(b) by 0 days.

(21) Appl. No.: 09/878,157

(22) Filed: Jun. 8, 2001

(65) Prior Publication Data

US 2002/0185806 A1 Dec. 12, 2002

(51) Int. Cl.[7] ................................................. B65H 3/08
(52) U.S. Cl. .......................... 414/797; 271/90; 271/91; 271/93; 271/104
(58) Field of Search ........................ 414/797; 271/90, 271/91, 93, 104

(56) References Cited

U.S. PATENT DOCUMENTS 4,806,071 A * 2/1989 Sartorio ....................... 271/262
4,971,515 A * 11/1990 Pol et al. ..................... 271/262
5,036,736 A * 8/1991 Hillock et al. ................. 83/100
5,083,764 A * 1/1992 Chambers .................... 271/106
6,006,638 A * 12/1999 Eltringham ................. 271/18.1

FOREIGN PATENT DOCUMENTS

JP          356019940 A  *  2/1981  ........... B21D/43/00

* cited by examiner

Primary Examiner—Eileen D. Lillis
Assistant Examiner—Michael Lowe
(74) Attorney, Agent, or Firm—Oppenheimer Wolff & Donnelly LLP (57) ABSTRACT

The device and method prevents a robot from carrying two blanks stuck together i.e., a double blank, from being transported storage station to a workstation. Suction cups on the robot arm grip the blank. The robot transports the blank to a double blank separation station, which has suction cups facing the opposite side of the blank. If the blank is a double blank, the opposing force from the suction cups pulls the blanks apart. The robot carries the separated single blank to the workstation. Instead of returning to the storage station to obtain another blank, the robot returns to the double blank separation station to pick up the separated blank that remained there.

5 Claims, 5 Drawing Sheets

SYSTEM AND METHOD FOR SEPARATING DOUBLE BLANKS

BACKGROUND OF THE INVENTION

1. Field of the Invention

The present invention is a system and process for preventing robotic systems from transferring two blank work pieces, i.e., a double blank, from a stack of blanks to the destination for the blank.

2. General Background and State of the Art

The manufacturing process of stamping, forming and assembling sheet metal components often needs to pick a piece of sheet metal automatically from a stack and load it into a machine for processing. The sheet metal may be blanks picked up from a stack of blanks for loading into the first machine in a line of subsequent stamping, forming or other operations. Alternatively, the sheet metal can be already stamped to form a stack of identical parts, which are loaded into another machine. Though some processes manually pick the top sheet from a stack, the present invention deals with an automated process.

Automated processes for picking a sheet from a stack use either a six-axis programmable robotic manipulator or so-called "hard automation" or "fixed automation." The latter means a two- or three-axis device for picking from a first point and placing at a second point. Either method of manipulating parts requires an end-of-arm-tool, or EOAT, which grips, holds and releases the piece so the manipulator can pick the top sheet from the stack and move it to its destination. The technology of choice for the EOAT of most applications is vacuum suction cup gripping. Using compressed air and a vacuum pump or venturi type vacuum generating device, rubber suction cups come in contact with and adhere to the part due to the vacuum. When the manipulator has picked and moved the part to its destination, the pressure is reversed and the part is "blown-off," or released from the suction cups. Hardwick and Littlewood, "Sheet Material feeding and Unloading Apparatus," U.S. Pat. No. 5,848,785 (1998), describes such a process. This technology is well proven and in use in thousands of applications.

Occasionally, the manipulator picks a blank from the stack and the next blank in the stack sticks to the first sheet. This is referred to as a double blank condition. Factors that can cause the blanks to stick together include oil or other substances, corrosion, dirt and static electricity. Mechanical interlocking of small metal burrs especially on processed parts also cause double blanks. If the stamping, forming, welding or other process calls for a single blank, loading a double blank would be undesirable. It wastes money, generates scrap parts, causes lost production time, and damages equipment. The challenge of preventing a double blank from being loaded into a subsequent process is a major problem for the metal forming industry or other industries that handle flat sheets of material.

The metal forming industry employs methods to address this problem:

1. Fanner magnets: These are powerful magnets that are brought within close proximity of the edge of the parts in a stack. The magnets cause the rest of the stack to repel the top blank in the stack. They only work with steel or other magnetic material, not aluminum, plastic, or other non-magnetic material.
2. Air knives: These are nozzles that direct a high pressure stream of air at the edge of the blanks to displace the parts with air pressure enough to break the bond with the next part. Air knives are not always successful.
3. Double blank detectors: They are electronic sensing devices that can mount on the EOAT. The face of the sensor is forced flush with the surface and electronically detects if two blanks are present. When the system detects a double blank, the system ejects both blanks to a separate location.

Fanner magnets and air knives act on the stack itself and are passive. They can give the process the best chance of avoiding double blanks, but they are not completely reliable. Once the robot picks a double blank and moves it away from the stack, the fanner magnets or air knives do not work and are not in a position to work. Without manual intervention, a double blank may be loaded.

Detectors have different problems. They only detect. If the double blank detector detects a double blank, it can send a signal to a control device to initiate an action. Nevertheless, the detector itself cannot correct the double blank condition. When the process control device of some applications receives a signal that a double blank condition exists, it signals the manipulator to shake the EOAT trying to unstick the stuck blank from the gripped blank. This approach is very primitive and unreliable. When it works, the dislodged blank often lands in an incorrect location or orientation. Therefore, a person must intervene to return the dislodged blank to the stack of blanks or to the workstation.

Prior patents disclose some of these concepts. Moltrasio et al., "System for Picking Up and Separating Bags from a Stack to be Applied to Automatic Apparatus," U.S. Pat. No. 4,516,762 (1985), discloses an upper unit with downwardly facing suction cups to lift a paper bag from a stack of bags. "Unsticking units" consisting of bars separate any bags beneath the one being picked up. Sartorio et al., "Method of Unstacking Metal Sheets," U.S. Pat. No. 4,806,071 (1989), has two side-by-side units. The units can move laterally relative to an unloading plate. The plate slides back and forth. Each upper element can pick up a metal sheet from a stack using suction cups. If the device detects only one blank, the upper element lowers the blank onto a lower element. If the device detects three or more blanks, it has a method for rejecting a larger stack. If it detects only two plates, i.e., a double blank, the device separates the two plates.

Previously-mentioned U.S. Pat. No. 5,848,785 uses downwardly facing suction cups for lifting a blank from a stack. A sensor checks whether only a single blank has been lifted or whether a second sheet also has been lifted. If the sensor detects a second sheet, upwardly facing vacuum cups on a frame are moved into an operative position below the second sheet. Those upwardly facing cups pull the double blank away from the first blank.

INVENTION SUMMARY

Solving problems of prior art devices is a principal object of the present invention. Another object of the present invention is to disclose a system and method for separating double blanks from each other. Another object of the present invention is to accomplish separation automatically. Another object of the present invention is to have a double blank separation station as a separate, stationary unit to be accessed by a preexisting programmed robotic manipulator. These and other objects will be apparent to those skilled in the art.

The present invention uses a manipulator to transfer a blank from a stack of blanks to a workstation. The manipulator transfers a blank first to a double blank separation station for separation. If the manipulator picks a double blank, the two blanks are separated at the separation station. The upper blank stays on the manipulator, but the lower blank stays at the station. Then, the manipulator moves the upper blank to the workstation. The manipulator then returns to the station to pick up the lower blank, which had stayed at the station. Then the manipulator carries the lower blank to the workstation. Finally, the manipulator returns to the stack of blanks for additional blanks.

The double blank separation station of the present invention is intended to be used with a programmable robotic manipulator having an EOAT that has means for gripping and holding a blank to be removed from a stack and moved to its destination. The gripping means usually is vacuum suction cups for picking up the blank or part to be moved. Reversing the vacuum "blows off" or releases the blank from the suction cups.

If the suction cups on the EOAT pick up a double blank, i.e., two blanks stuck together, the double blank separation station of the present disclosure can be accessed for separating the blanks. The station in the exemplary embodiment comprises inverted suction cup, which mate with the underside of the part being picked. The double blank separation station can be incorporated into the process in either an "every cycle" or "double blank detected" manner. In the every cycle approach, the station is accessed during every cycle. In the "detected" approach, the station is accessed only when a double blank situation is detected.

In either case, the robotic manipulator moves the blank to the double blank separation station onto the upward facing suction cups. With the upper and lower suction cups in the "vacuum on" mode, the manipulator moves upwardly from the double blank separation station by 1/16 or 1/8 inch (1.5–3 mm). If there are two blanks, the force separates them. If there is only one blank, the natural compliance of the rubber cups will accommodate this much movement without letting go top or bottom. Thereafter, the lower cup vacuum of the double blank separation station is turned off and the robot is free to move a single blank to the destination. If there were actually two blanks, gravity retains the separated blank at the station.

The double blank separation station is equipped with a part-sensing device such as a proximity switch or mechanical limit switch that notifies the controller of the robot that a blank now resides on the station. On a next cycle, the manipulator will return to the double blank station instead of the stack of blanks to pick up the separated blank before it resumes its normal process of accessing the stack of blanks.

In a double blank detected mode, the robotic manipulator picks up the blank(s) from the stack. When the blank moves clear, a cell controller looks for a signal from a double blank detector that a double blank is present. If such is the case, the robotic manipulator moves the blank(s) to the double blank separation station. If the detector senses a single blank, the manipulator transports the block directly to the workstation, bypassing the separator One of the advantages of the present invention is that the double blank separation station is a separate unit that can be incorporated when needed with preexisting conventional multi-axis programmable robotic manipulators where provisions for blank separation were not incorporated in the original design of the components.

DETAILED DESCRIPTION OF THE PREFERRED EMBODIMENTS

Figure 1:
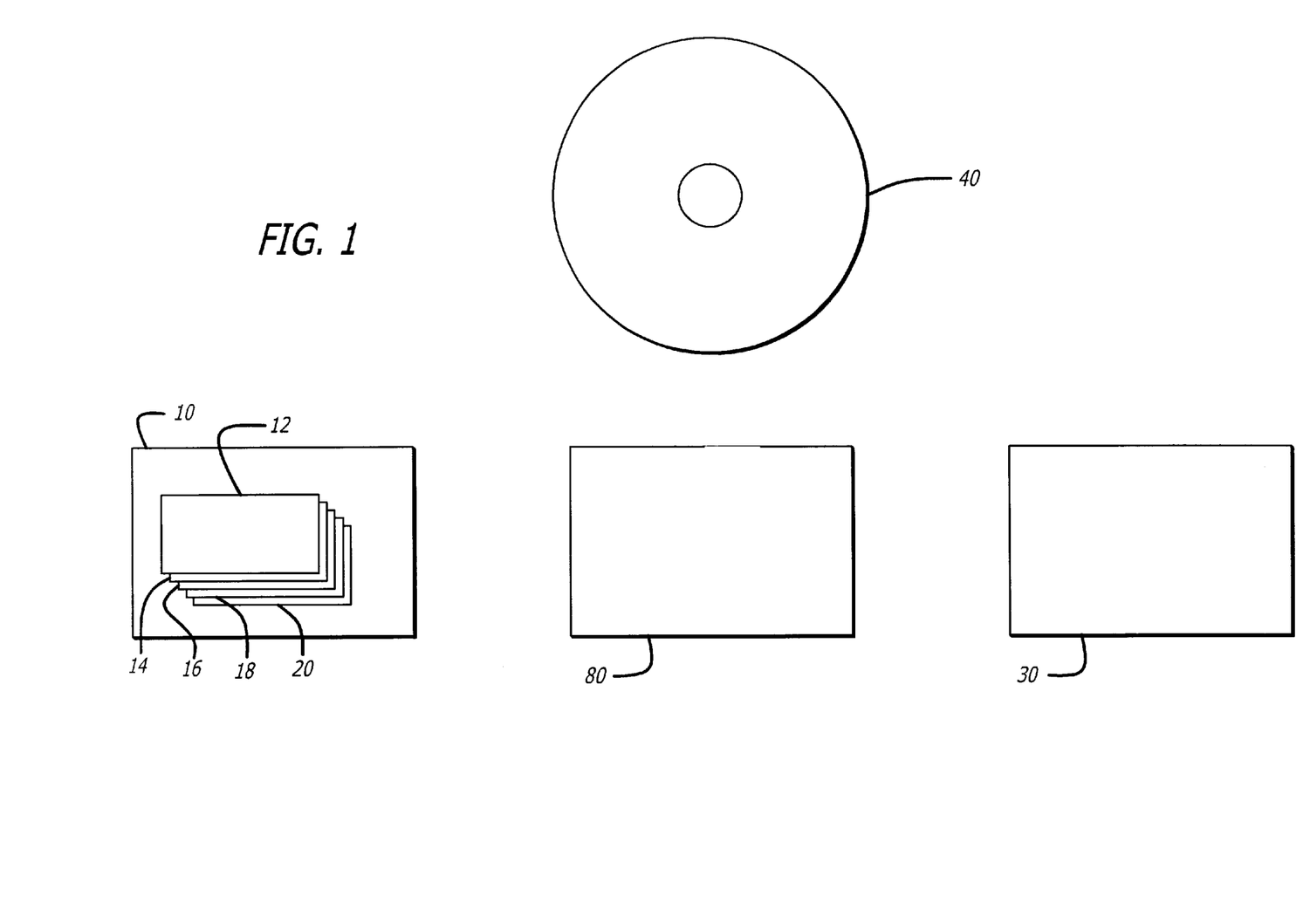
FIG. 1 is schematic view of the double blank separator of the present invention.

The double blank separator apparatus of the present invention transport blanks from a storage station to a workstation. In the exemplary embodiment of FIG. 1, storage station 10 holds top blank 12, lower blanks 14, 16, 18 and 20 below the top blank and other blanks below the lower blanks. The term "blank" may include cut sheets of metal or other material. In addition, blanks can be already stamped or processed as identical parts. The blanks normally are stacked directly on top of each other, but they are not shown that way in FIG. 1 so that the blanks below top blank 12 could be visible in the drawing.

The "top" blank is the exposed or upper-most blank of a stack of blanks at any given time. Thus, when the top blank is removed from the stack (assuming only one blank is removed), the blank immediately below the top blank becomes the top blank. The storage station 10 may have guides (not shown) for holding the blanks in a stack. A spring or other vertical positioner may keep the top blank 12 at a predetermined vertical position. Keeping the stack vertical and removing the upper-most blank is conventional and preferred, but in theory, the blanks could be mounted horizontally with the "top" blank removed from an end. Likewise, it is possible to remove the bottom blank (assuming unimpeded access to that blank) if the stack can be secured and if the system could remove only one blank (or an occasional double blank). The application sometimes refers to "a blank structure," which comprises the top blank 12 or the top blank and at least one other blank, e.g. blank 14, from the stack of blanks.

The workstation 30 may be any of the many different types of stations for further processing of a work piece.

Figure 2:
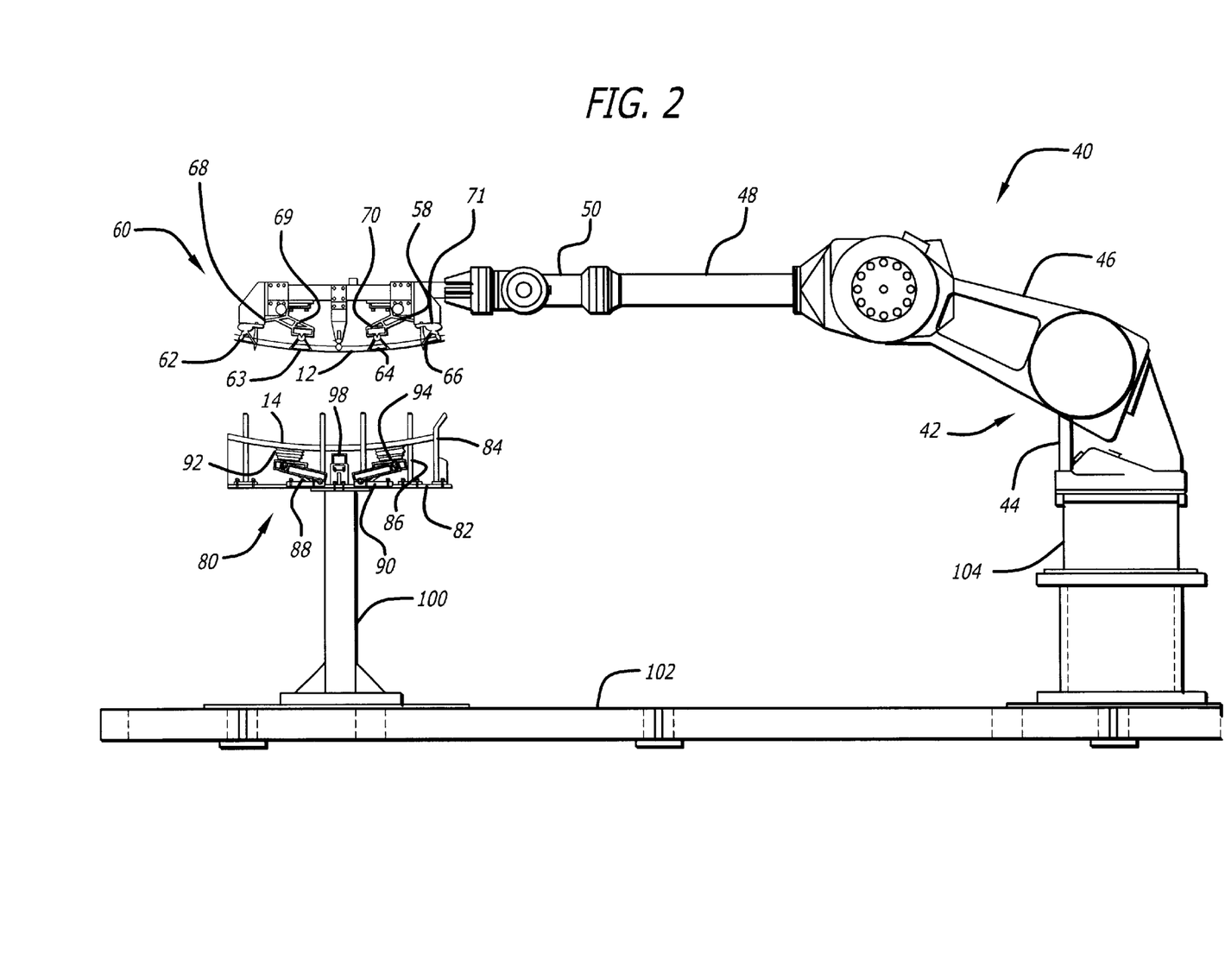
FIG. 2 is a perspective view of the double blank separation station of the present invention.

A transporter moves between the storage station 20 and the workstation 30. The transporter 40 (FIGS. 1 and 2) in the exemplary embodiment is a six-axis programmable robotic manipulator 42 (FIG. 2). The position of the storage and workstations 10 and 30 is a matter of choice depending on the size of the work piece being transported, the manufacturing process, limitations on the positions due to the presence of other machines or the layout of the metal working facility and other factors. Instead of six-axis programmable robotic manipulator 42, the present invention may use other types of transporters including two- or three-axis device for picking from one first point to another (i.e., from the storage station to the workstation).

Robotic manipulator 42 has a rotatable base 44 and a first arm 46 extending from and rotatable from one end from the base. A second pivoting arm 48 pivots on the free end of the first arm. Finally, a third arm 50 pivots on the free end of second arm 48. The third arm also rotates about its longitudinal axis. By rotating the base 44 and pivoting the first, second and third pivoting arms 46, 48 and 50, the free end of the third arm can reach any position within the range of the robot. In addition, because the third arm can rotate about its axis, the robot also can orient any tool on the end of the third arm 50. Though the exemplary embodiment is described in conjunction with a six-axis programmable robot, it can be modified for use with fixed or hard automation.

Figure 6:
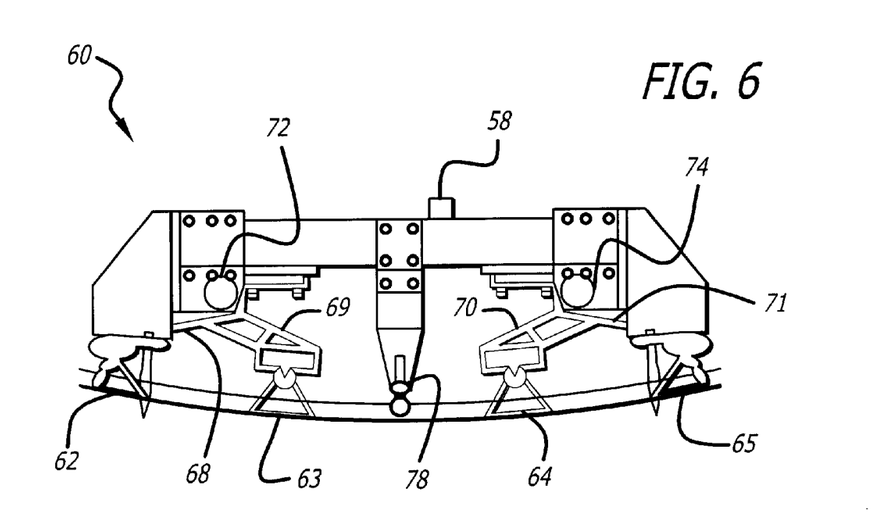
FIG. 6 is a front view of the EOAT of the present invention.

An end-of-arm-tool (EOAT) 60 attaches to the free end of third arm 50 (FIGS. 2 and 6). The EOAT grips, holds and releases the work. In the exemplary embodiment, the EOAT 60 uses vacuum suction cups for gripping a work piece. A vacuum pump or venturi type vacuum generating device (not shown) on the EOAT or the robot applies a vacuum to suction cups 62, 63, 64 and 65 through fitting 58 (FIG. 2). The suction cups are mounted on the ends of arms 68, 69, 70 and 71 for proper positioning. The arms mount on shafts 72 and 74 (FIG. 6). The arms may be in a fixed orientation, may be adjustable or may pivot about the shafts during operation. Springs (not shown) may bias the arms toward the position shown in FIGS. 2 and 6.

The suction cups may be rubber or other rubber-like material. The suction cups also may be rigid with a rubber or rubber-like ring of material around the open end of the cups. Though the exemplary embodiment uses suction cup gripping, the system could used other types of gripping including pinchers or other mechanical grippers. The shape of the blank or work piece may affect the choice of gripper. In addition, the drawings show only four suction cups, but their number and position vary depending on the size of the blank being moved.

Under control of computer programming, robot 42 positions the EOAT 60 so that the suction cups 62, 63, 64 and 65 contact the top blank 12 at the storage station 10. The program then activates the vacuum pump to apply a vacuum to the suction cups. The vacuum causes the suction cups to adhere to the work piece.

In the prior art without provisions for double blank separation, robot 42 would carry the work piece 12 from storage station 10 directly to the workstation 30. When the robot places the work piece properly on the workstation, the computer program signals the vacuum pump to reverse the pressure. The positive pressure blows or releases the work piece from the suction cups.

Figure 5:
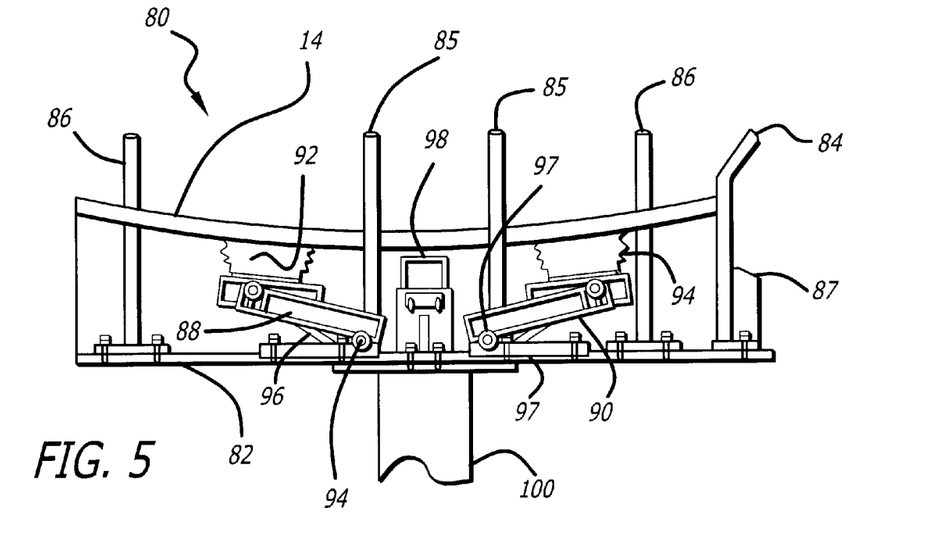
FIG. 5 is a front view of the double blank separation station of the present invention.

The present invention also includes a double blank separation station 80 spaced from the storage station 10 and the workstation 30 for separating a second blank from the top blank 12. In the exemplary embodiment, double blank separation station 80 has a base 82 (FIGS. 2 and 5). The base mounts on an upright support 100, which is secured to surface 102. Surface 102 also supports robot 42 on a robot station 104.

The mounting of the double blank separation station allows it to be incorporated into existing systems as long as the double blank separation station can be located within the reach of the robot. As is evident from the discussion below, the robot's controller must be reprogrammed to use the double blank separation station. With proper placement and reprogramming, existing systems can use the double blank separation station of the present invention.

Several upstanding guides including side guide 84, rear guide 85 and front guide 86 on the base 82 of the double blank separation station act to position a blank after the suction cups on the EOAT release the blank. Base 82 presents a convenient surface from with to mount the guides. By having preexisting holes through base 82, the person setting up the double blank separation station can properly position the guides for the size of any particular blank. The attachment between the guides and the base also could be adjustable. The guides also may include braces 87 (FIG. 5) to strengthen the guides.

The double blank separation station includes a double blank gripper applying a gripping force in a direction opposite to the gripping force applied by the blank gripper. In the exemplary embodiment (FIGS. 2 and 5), a pair of arms 88 and 90 extend upward from the base 82. Each arm has a suction cup 92 and 94, which faces upward. FIGS. 2 and 5 show the suction cups holding blank 14, which had been immediately below top blank 12 (FIG. 2). The arm 88 and 90 mount to shafts 94 and 95 that mount on a fitting 96 or 97 attached to base 82 (FIG. 5). The arms may be fixed, adjustable or may pivot about the shafts to conform under spring bias to a blank.

The system of the present invention may employ a sensor such as a proximity switch 78 to determine if the EOAT has picked up two blanks. If the sensor determines that the EOAT is carrying a double blank, robot 42 carries the double blank to the double blank separation station 80 where the blanks are separated in a manner discussed below. If the sensor determines that the EOAT is carrying a single blank, the robot can bypass the double blank separation station and carry the blank directly to the workstation 30. If the EOAT does not have a sensor or if the controller is so programmed, the robot stops at the double blank separation station between each movement from the storage station 10 to the workstation 30. Because the double blank separation station is stationary and easily reached by the robot, having the robot stop at the station on each cycle is the preferred method of operation. If the EOAT has a double blank, the double blank separation station 80 separates them the blanks. If the EOAT has only one blank, the robot stops at the double blank separation station while the EOAT continues to hold the single blank. The robot then carries the single blank to the workstation.

When the EOAT holds a double blank, the EOAT positions the two blanks on the double blank separation station 80. Suction cups 62, 63, 64 and 65 continue holding top blank 12. The other blank 14 contacts the suction cups 92 and 94 of the double blank separation station. See FIGS. 2, 5 and 6. The computer controller than activates suction cups 92 and 94. Consequently, those suction cups apply a downward force on blank 14. A sensor 98, which senses the presence of a blank, signals the controller to activate the suction cups 92 and 94. Alternatively, the controller can sense the position of the EOAT and activate suction cups 92 and 94 when the EOAT is positioned such that a blank would be in contact with the suction cups. Springs may urge arms 88 and 90 upward to position the suction cups in the path of any blank from the EOAT. This provides better attachment of the cups to the blank. The weight of the blank and force from the EOAT move the arms and cups to the position shown in FIG. 5.

The controller then signals robot 42 to move the EOAT vertically. Suction cups 62, 63, 64 and 65 continue holding top blank 12, and suction cups 92 and 94 continue holding blank 14. When the EOAT moves vertically upward preferably ⅟₁₆ or ⅛ inch in the exemplary embodiment, the force from the top blank 12 pulling away from the lower blank 14 becomes sufficient to overcome the force holding the blanks together. That is the position that FIG. 2 shows. Guides 84, 85 and 86 can direct blank 14 to a predetermined horizontal position for subsequent pick up by the robot.

A sensor 98 on the double blank separation station senses that blank 14 remains on the station (FIGS. 2 and 5). The sensor may be a proximity switch, a mechanical limit switch or another type of sensor. The sensor signals the controller to have the robot return from the workstation 30 to the double blank separation station 80 instead of to the storage station 10 to pick up the next blank. Consequently, robot 42 moves the EOAT into contact with blank 14 until suction cups 62, 63, 64 and 65 contact blank 14. The controller then signals the vacuum pump to activate the suction cups so that the cups grip blank 14. The suction cups 92 and 94 on the double blank separation station remain deactivated.

The controller activates robot 42 to remove the EOAT 60 and blank 14 from the double blank separation station and transport them to the workstation 30. The controller then deactivates or reverses the vacuum suction cups 62, 63, 64 and 65 to release blank 14 from the suction cups. Sensor 98 signals the controller that no blank is present at the double blank separation station. Therefore, robot 42 returns to the storage station 10 to pick up the next blank.

In one mode of operation, if the EOAT correctly picks up one blank 12 from the storage station, it positions the single blank against suction cups 92 and 94. Suction cups 62, 63, 64 and 65 continue holding top blank 12. Because sensor 98 senses the presence of a blank, it signals the computer controller to activate suction cups 92 and 94. The controller then signals robot 42 to move the EOAT vertically 1/16 or 1/8 inch. Suction cups 62, 63, 64 and 65 continue holding upper side of blank 12 and pull against the downward force from suction cups 92 and 94 acting on the bottom of the blank. The natural compliance of the cups accommodates the movement without releasing the blank from the top or bottom. Once the EOAT moves 1/16 or 1/8 inch upward, the controller deactivates the vacuum to suction cups 92 and 94. The robot then carries the blank to the workstation 30. Alternatively, instead of relying on the upward distance that the EOAT travels to control deactivation of the vacuum, a sensor can detect forces on the lower suction cups above the force necessary to separate double blanks. Exceeding that force would signal to the controller that the suction cups are holding a single blank. The controller then would release vacuum to the lower suction cups 92 and 94 to release the blank.

Another option is possible but not recommended. The lower suction cups 92 and 94 could remain on as the EOAT moves vertically. By designing the vacuums and the number of upper suction cups 62, 63, 64 and 65 versus the number of lower suction cups 92 and 94, the force from the upper suction cups could be greater than the force from the lower suction cups 92 and 94. Therefore, as robot 42 moves the blank upward, the force upward would overcome the force from suction cups 92 and 94. That would cause cups 92 and 94 to release the blank even though those suction cups remained activated. Suction cups 62, 63, 64 and 65 continue holding the blank. The option is difficult to control, and likely would cause serious vibrations and shocks to the system.

If the EOAT has a sensor that detects the presence of a double blank, and the sensor detects a single blank, the sensor can signal the controller to have the robot by-pass the double blank separation station. Therefore, the robot would only go to the double blank separation station if it carries a double blank.

Figure 3A:
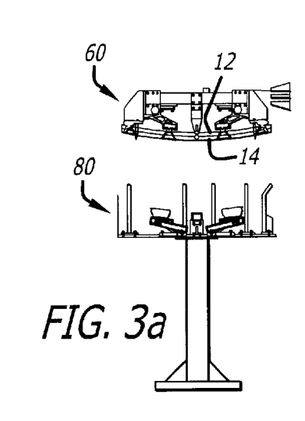
FIGS. 3a through 3i are sequence views of the shows what happens at the double blank separation station of the present invention when the EOAT carries two blanks from the storage station.
Figure 3B:
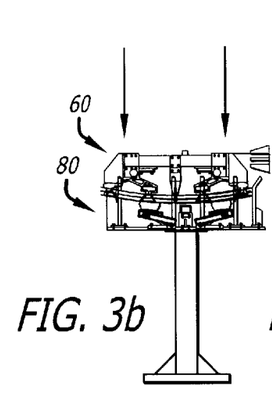
Figure 3C:
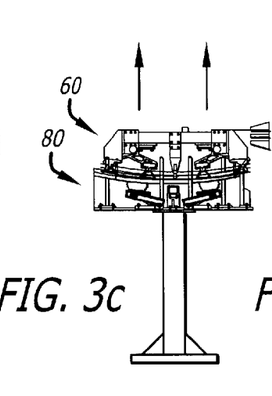
Figure 3D:
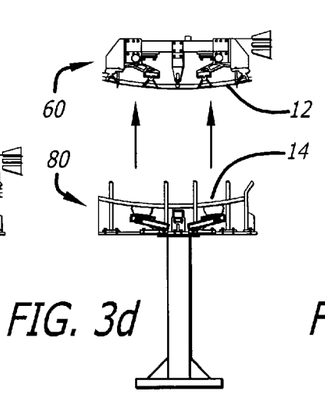
Figure 3E:
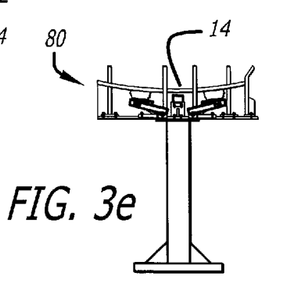

FIGS. 3a through 3i show the unwanted scenario in which the EOAT picks up a double blank. In FIG. 3a, the EOAT 60 carries two blanks 12 and 14 that are stuck together to the double blank separation station 80. The double blank lowers in FIG. 3b and mates to suction cups 92 and 94, which the controller then activates. The controller then signals the robot to raise the EOAT a short distance (FIG. 3c) to check for the presence of two blanks. If there are two blanks, the suction cups 92 and 94 hold the bottom blank while the EOAT holds the top blank. The separation forces cause the two blanks 12 and 14 to separate. FIG. 3d.

The controller turns off the vacuum to suction cups 92 and 94. The robot rises and clears the double blank separation station. After the robot deposits the top blank at 12 workstation 10, the separated second blank 14 remains at the double blank separation station 80 (FIG. 3e) where a sensor reports the blank's presence to the controller.

Figure 3F:
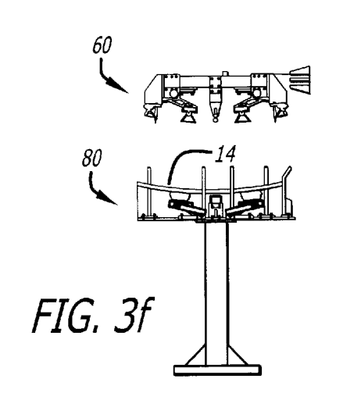
Figure 3G:
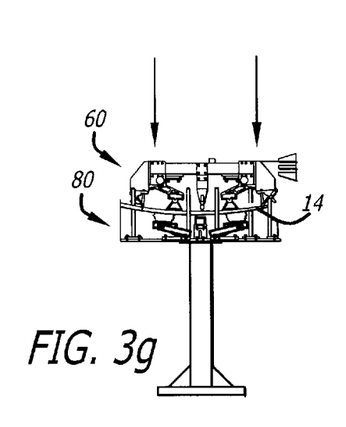
Figure 3H:
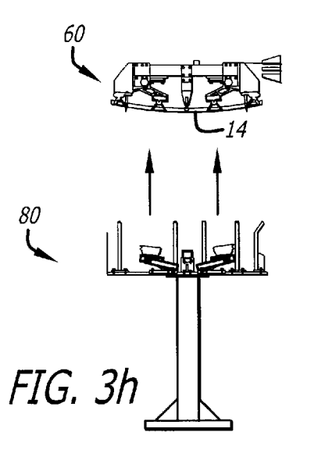
Figure 3I:
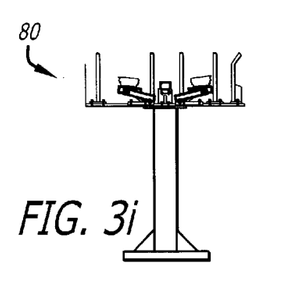

The controller directs the robot to return to the double blank separation station 80 without a blank. FIG. 3f. The robot lowers the EOAT 60 (FIG. 3g) to contact the previously detected double blank. The controller activates the vacuum pump to actuate the suction cups 62, 63, 64 and 65 on the EOAT to engage the remaining blank 14 (FIG. 5h) and then moves the blank away from the double blank separation station (FIG. 5i) to the workstation.

Figure 4A:
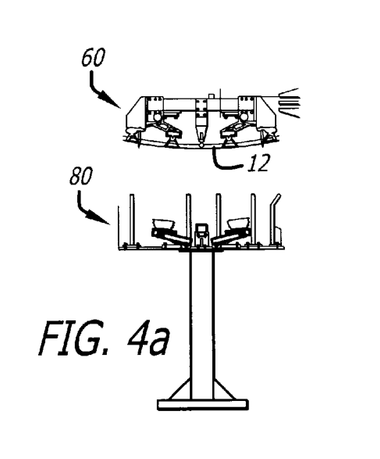
FIGS. 4a through 4e are sequence views of the shows what happens at the double blank separation station of the present invention when the EOAT carries one blank from the storage station.
Figure 4B:
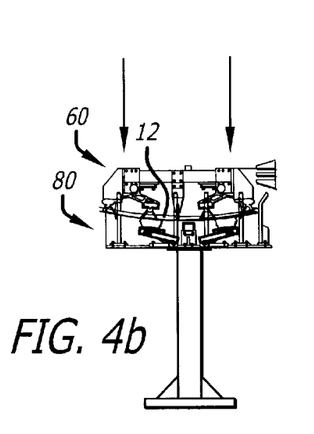
Figure 4C:
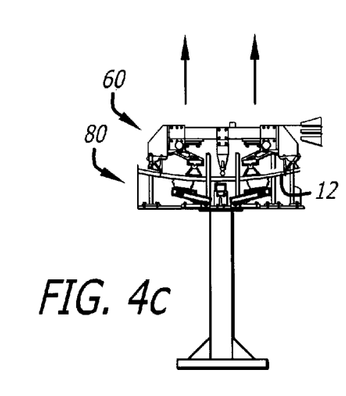
Figure 4D:
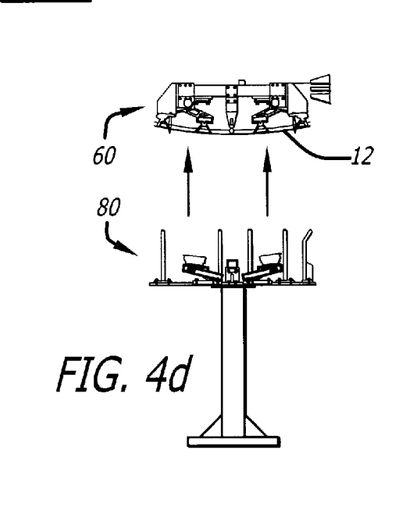
Figure 4E:
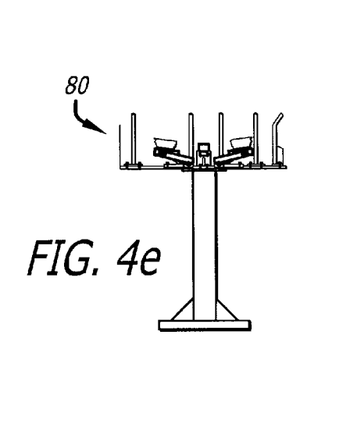

FIGS. 4a through 4e show what occurs when the EOAT engages only one blank at the storage station 10. In FIG. 4a, the EOAT 60 holds a single blank 12 above the double blank separation station. The robot lowers the blank into the double blank separation station (FIG. 4b) and causes the blank to engage the vacuum cups 92 and 94 on the double blank separation station. The upper suction cups 62, 63, 64 and 65 and the lower suction cups 92 and 94 now hold the blank. The robot raises the EOAT 60 a short distance (FIG. 4c). The natural compliance of the rubber cups allows for the distance moved while still maintaining suction on both top and bottom of the blank 12. The controller then turns off the vacuum to the lower suction cups 92 and 94 to release the blank. FIG. 4d. After the lower suction cups release the blank, the robot rises and, carrying a blank, clears the double blank separation station. FIG. 4e. The robot then carries the blank to the workstation 30.

Triple blanks, i.e., three blanks sticking to each other, also are possible but are rarer than double blanks. The system can detect and separate triple blanks. First, a sensor on the EOAT could detect a triple blank. When it occurs, the robot carries the blanks to the double blank separation station. The upper and lower suction cups pull the blanks apart in two possible ways: two blanks remaining on the EOAT or two blanks remaining on the double blank separation station. Sensors can determine which occurs. If two blanks remain at the double blank separation station, the robot transports the single, separated blank to the workstation. The sensor detects that at least one blank remains at the double blank separation station. After the robot returns to the double blank separation station, the upper suction cups engage the top blank and the lower suction cups engage the bottom blank. The process proceeds as if the double blank separation station is separating two blanks.

On the other hand, if a single blank of a triple blank remains at the double blank separation station and a sensor detects that a double blank remains on the EOAT, manual intervention could be required. The double blank on the EOAT cannot be separated because the third blank blocks the remaining double blank from engaging the suction cups on the double blank separation station. To avoid manual intervention, the system could mount a second double blank separation station. Having a second double blank separation station is especially appropriate if triple blanks are common. The controller would direct the EOAT to travel to the second station after each move to the first station. Alternatively, the EOAT could travel to the second station only if a sensor determines that two blanks remain on the EOAT after the EOAT leaves the first double blank separation station.

Without the second double blank separation station, when a single blank of a triple blank remains at the double blank separation station and a double blank remains on the EOAT, manual intervention likely is required. A sensor would signal the need for manual intervention. An operator either could return the robot to the storage stack and manually separate the double blank or he or she could remove the single blank from the double blank separation station and allow that station to separate the double blank. The size and weight of the blank may enter into the choice of the method.

While the specification describes particular embodiments of the present invention, those of ordinary skill can devise variations of the present invention without departing from the inventive concept.

We claim:

1. In a system for transporting blanks from a storage station to a workstation comprising a transporter movable between the storage station and the workstation and a blank gripper on the transporter, selectively applying a gripping force or releasing the gripping force on a blank, the improvement comprising the provision of:

a double blank separation station mounted in a fixed position, which is accessible by the transporter, the double blank separation station having a double blank gripper selectively applying a gripping force in a direction opposite to the gripping force applied by the blank gripper; and a controller, the controller controlling movement of the transporter from the storage station, then to the double blank separation station and then to the workstation irrespective of the number of blanks being transported by the transporter, the improvement further comprising the provision of the double blank separation station comprising a base, at least one guide connected to the base for directing a blank to a position on the double blank separation station.

2. A double blank separator apparatus for separating a double blank carried by a transporter from a storage station to a workstation, the apparatus comprising:

a) transporter blank gripping means on the transporter for selectively applying a gripping force or releasing the gripping force on a blank;

b) double blank gripping means positioned to contact a double blank carried by the transporter, for applying a force on the double blank in a direction opposite to the gripping force applied by the transporter blank gripping means;

c) a controller, the controller controlling movement of the transporter from the storage station, then to the double blank separation means and then to the workstation irrespective of the number of blanks being transported by the transporter, d) a base, wherein the double blank gripping means comprises at least one arm positioned relative to the base, at least one double blank suction cup positioned on each arm, and e) further comprising at least one guide connected to the base for directing a blank to a position on the double blank separation station.

3. A process for preventing a transporter from transporting a double blank instead of a single blank to a workstation from a stack of blanks at a storage station, the stack of blanks having an exposed blank, the process comprising:

a) moving the transporter to the exposed blank of the stack of blanks at the storage station;

b) applying a gripping force from the transporter on the exposed blank;

c) moving the transporter away from the stack of blanks while applying the gripping force on the exposed blank to remove from the stack of blanks, a blank structure, the blank structure comprising the exposed blank or the exposed blank and at least one other blank from the stack of blanks;

d) transporting the blank structure to a double blank separation station;

e) applying at the double blank separation station a double blank releasing force on the blank structure in a direction opposite the gripping force from the transporter, the double blank releasing force being applied while the gripping force is applied and being less than the gripping force, whereby the resulting force from the gripping force and the double blank releasing force separating the blanks if the blank structure comprises at least two blanks and releasing the exposed blank if the blank structure comprises only the exposed blank, whereby, the exposed blank remains on the transporter; and f) transporting the exposed blank to the workstation.

4. The process of claim 3 further comprising sensing whether a blank remains at the double blank separation station after the exposed blank is removed from the double blank separation station, and, if a blank remains at the double blank separation station, returning the transporter to the double blank separation station before the transporter returns to the storage station; applying the gripping force from the transporter to the blank at the double blank separation station; moving the transporter away from the double blank separation station to remove the blank from the double blank separation station; and transporting the blank to the workstation.

5. The process of claim 3 wherein the transporter moves to the double blank separation station each time it moves from the storage station to the workstation.

* * * * *